Figure 1:
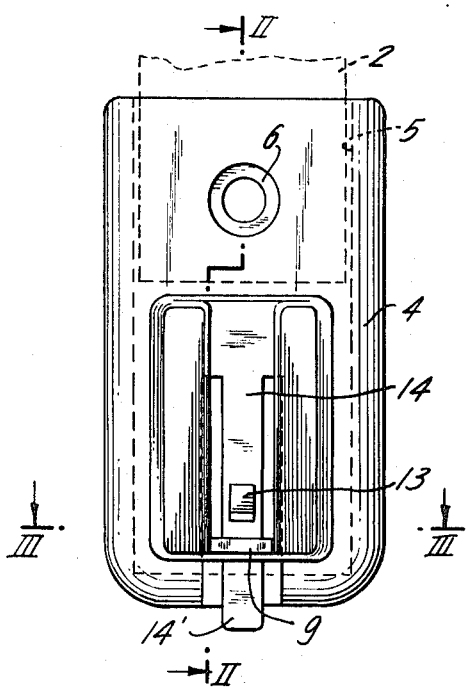

United States Patent

[11] 3,631,572

[72] Inventor  Karl Heinz Lange
               Bunde-Ennigloh, Germany
[21] Appl. No. 842,446
[22] Filed     July 17, 1969
[45] Patented  Jan. 4, 1972
[73] Assignee  Balda Werke Photographische und
               Kunstsstoff R. Gruter
               Kommanditgesellschaft
               Bunde am Westphalia, Germany
[32] Priority  Sept. 24, 1968
[33]           Germany
[31]           P 17 97 394.3

[54] CARRYING STRAP MOUNTING
     3 Claims, 5 Drawing Figs.
[52] U.S. Cl. ................................................ 24/223,
                                    24/201, 224/5, 248/224
[51] Int. Cl. ............................................. A44b 17/00
[50] Field of Search .......................................... 24/230 BC,
     224 SB, 201 R, 223, 222, 224; 248/224, 225;
     16/114, 125, 126; 224/5 V, 5 R; 95/86

[56]           References Cited
               UNITED STATES PATENTS
     381,833    4/1888   Fried ..................... 24/230 BC
   1,044,686   11/1912   Osmers .................. 24/230 BC
   1,709,144    4/1929   Mueller ................. 248/224
   1,869,974    8/1932   Masters ................. 248/224 X
   3,055,462    9/1962   Steele .................. 248/224
               FOREIGN PATENTS
   1,026,642    4/1966   Great Britain ........... 24/230 BC Primary Examiner—Bernard A. Gelak
Attorney—Sparrow and Sparrow ABSTRACT: A carrying strap particularly suitable for cameras has a clawlike and accordingly hollow shaped connecting part which fits over a correspondingly shaped protruding member on the outside wall of the piece to be carried; particularly a camera or a notch on the protruding member is provided, and an elastically deflectable latch means having a protruding nose is integrally formed on the connecting part, which nose fits into the notch for securing the connecting part in place on the piece to be carried by the strap.

INVENTOR.
KARL HEINZ LANGE
BY
SPARROW AND SPARROW
ATTORNEYS

CARRYING STRAP MOUNTING

BACKGROUND OF THE INVENTION

Cameras used to be accommodated in a casing provided with a carrying strap in order to be able to support them by the strap when not in use, the protecting casing normally being shaped in such manner that camera exposures were possible while the casing was carried by the strap.

Recently cameras have been developed for which only a protective cover for the front part with the lens and for the operating devices is provided instead of a complete protective housing. In this case it is desirable to provide, the camera itself with a carrying band or with a small carrying loop.

It is further known similar to said protective housing, to drawn on cameras the carrying strap though an eyelet of the camera body and to rivet it there. But by this method the carrying strap is connected once and for all with the camera while it is still desired to use or sell the camera at will without a carrying strap.

SUMMARY

The present invention offers the possibility to connect detachably the carrying strap to the camera body in an advantageous manner. This is effected by providing one of the parts with a clawlike and accordingly hollow connecting piece and the other with a corresponding stemlike piece whereby one can be slid over the other.

Advantageously one of the two parts is provided with an integrally molded spring resting in the corresponding piece, a protruding end of the spring allowing to disengage the latched piece. By such structure which is in view of mass production simple and cheap, the carrying strap can be conveniently connected with the camera or can be disengaged from it.

SHORT DESCRIPTION OF DRAWING

In the following description and in the claims, parts will be identified by specific names for convenience, but such names are intended to be as generic in their application to similar parts as the art will permit. Like reference characters denote like parts in the several figures of the drawings, in which FIG. 1 shows a plan view of a connecting area between a carrying strap and a camera, FIG. 2 a section along line II—II of FIG. 1, FIG. 3 a section along line III—III of FIG. 1, FIG. 4 a side view of a carrying strap connection at a second embodiment, FIG. 5 a section along line V—V of FIG. 4.

DESCRIPTION

Figure 2:
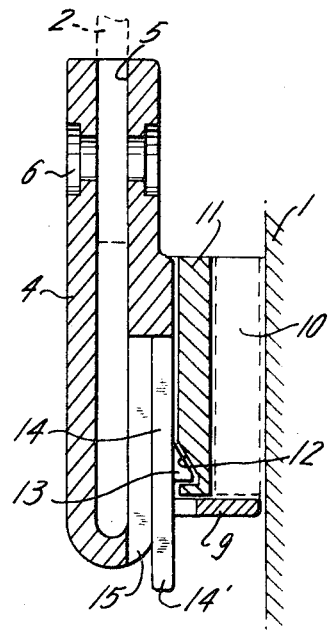
Figure 3:
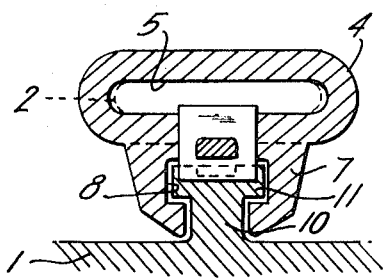

In the drawing a camera body 1 is shown and a carrying strap 2 releasably and detachably connected with camera body 1. For this purpose is shown in the embodiment of FIGS. 1 to 3 the carrying strap 2 being provided with a connecting piece 4 consisting of plastics by inserting the strap 2 into a corresponding recess 5 and securing it by a rivet 6. The connecting piece 4 is provided with flanges 7 extending from the for side of the strap to the middle of piece 4, with flanges 7 forming a T-shaped recess 8 which in the direction toward strap 2 is open but in the opposite direction is partly closed by a wall 9. The recess 8 serves for receiving a projection 10 having a T-shaped cross section and being integral with camera body 1.

The T-shaped projection 10 on the strap side is slid into recess 8 till abutting at wall 9. Strap 2 then is running parallel to the wall of housing 1. Flange 11 of projection 10 has a locking recess 12, into which the nose 13 of a spring 14 can engage like a latch. Spring 14 is integrally connected on connecting piece 4 of strap 2. It protrudes outwards with its free end 14' through an opening 15 of piece 4 so that it can be deflected to the left in FIG. 2 so that nose 13 of spring 14 will be disengaged from recess 12 and part 10 can be lifted out. By this manner is strap 2 can be easily detached and can be put back in place. Of course the connecting piece having the flanges can be attached to the camera body and the stemlike part can be attached to the strap.

Figure 4:
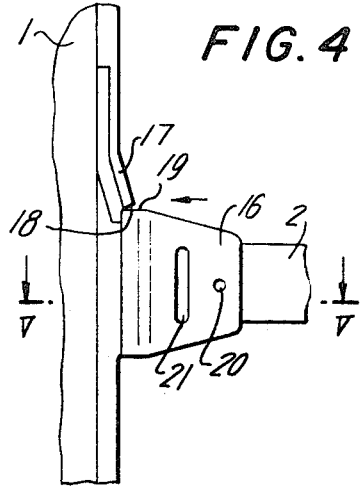
Figure 5:
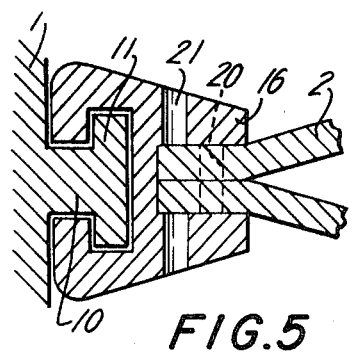

A second embodiment is shown in FIGS. 4 and 5. In this case the part 16 which is connected with the strap 2, has also a recess 8 with a T-shaped cross section such as shown in the embodiment of FIGS. 1 to 3 but without having a spring latch. In this embodiment a spring latch 17 is made integral on body 1 of the camera when part 16 is inserted, latch face 18 of spring 17 abuts against the back side 19 of the connecting piece 16. Strap 2 of this embodiment runs at right angle to the wall of housing 1. For detaching of part 16 spring 17 has to be forced in the direction of the arrow whereupon connecting piece 16 can be slid out upwardly attaching of strap 2 to connecting piece 16 can be effected by a forming process. The ends of the strap have a punched hole 20 and are held by a tool forming two recesses 21 and are finally die cast into pieces 16.

The described connecting means of a carrying strap may be also used for other objects such as tool-bags and the like.

What I claim is:

1. Releasable and detachable connection for a carrying strap for a camera and the like, said connection comprising the combination of two pieces, one of said pieces being attached to said carrying strap, the other of said pieces being an integral part of said camera and the like, said one piece having flanges thereon forming an elongated recess, said other piece having a corresponding elongated stemlike projection having an enlarged head, said enlarged head being disposed for being positioned within said recess and engaging said flanges for preventing said two pieces being separated sideways but providing for a relative sliding movement thereof upon each other, said elongated recess being open at one end, a wall at the end of said recess, and a spring latch having a nose, said nose having an oblique surface disposed for the assembling of said two pieces without manually operating said spring latch, said nose further having a resting surface disposed for preventing said pieces from sliding relative to each other in the direction opposite to the direction of assembling, and an outwardly extending free end on said spring for manually disengaging said latch for permitting said two pieces to be slid apart.

2. Releasable and detachable connection for a carrying strap according to claim 1, both said projection and said elongated recess formed by said flanges having T-shaped cross sections.

3. Releasable and detachable connection for a carrying strap according to claim 2, said enlarged head of said projection having a locking recess for said nose of said spring latch, said recess being located at the end of said enlarged head, said end disposed for being inserted first into said recess on said one piece at assembling of said two pieces, and said spring latch being integral on said one piece.

* * * * *